3,780,044
Patented Dec. 18, 1973

3,780,044
1-[3-[5,11-DIHYDRODIBENZ[b,e][1,4]OXAZEPIN-5-YL]PROPYL]-PHENYLPIPERIDINOLS
Harry L. Yale, New Brunswick, N.J., assignor to E. R. Squibb & Sons, Inc., Princeton, N.J.
No Drawing. Filed Sept. 22, 1972, Ser. No. 291,422
Int. Cl. C07d 87/54
U.S. Cl. 260—293.58                2 Claims

ABSTRACT OF THE DISCLOSURE

Compounds of the formula

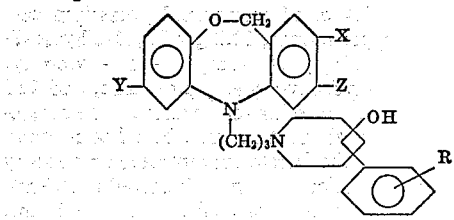

are effective antibacterial agents.

OBJECTS OF THE INVENTION

It is an object of the present invention to provide new chemical compounds which are effective antibacterial agents. Another object is to provide a method for the preparation of these new antibacterial compounds. A further object is to provide a method and compositions for the administration of the antibacterial compounds of the invention. These and other objects will be apparent from the following description.

SUMMARY OF THE INVENTION

Compounds of the formula

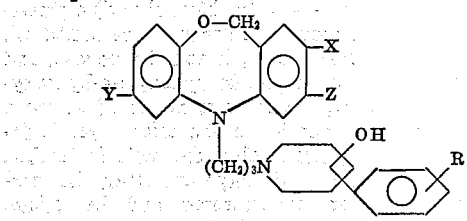

wherein Y is trifluoromethyl, F, Cl, Br, X is H or Br, Z is H, Cl or Br and R is hydrogen, alkyl of from 1 to 4 carbons, halogen (F, Cl, Br or I), alkoxy of from 1 to 4 carbons, thioalkyl of from 1 to 4 carbons or trifluoromethyl, are effective antibacterial agents. These compounds may be administered systemically or topically in such forms as, for example, tablets, liquids, or creams.

DETAILED DESCRIPTION

The antibacterial compounds V of the present invention may be prepared by reacting a 5,11-dihydro-7-(trifluoromethyl)dibenz[b,e][1,4]oxazepine compound of Formula I with a 3-[(2,2-, 3,3- or 4,4-hydroxy-R-substituted-phenyl)piperidino]-propyl chloride compound of Formula II, or by reacting a 5,11-dihydro-7-(trifluoromethyl)dibenz[b,e][1,4]oxazepin-5-yl-propyl chloride compound of Formula III with a 2-, 3-, or 4-hydroxy-2-, 3-, or 4-R-substituted-phenyl piperidine compound of Formula IV.

These reaction schemes are shown below:

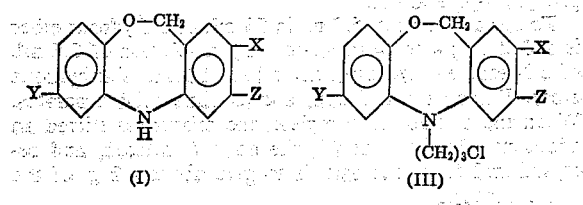

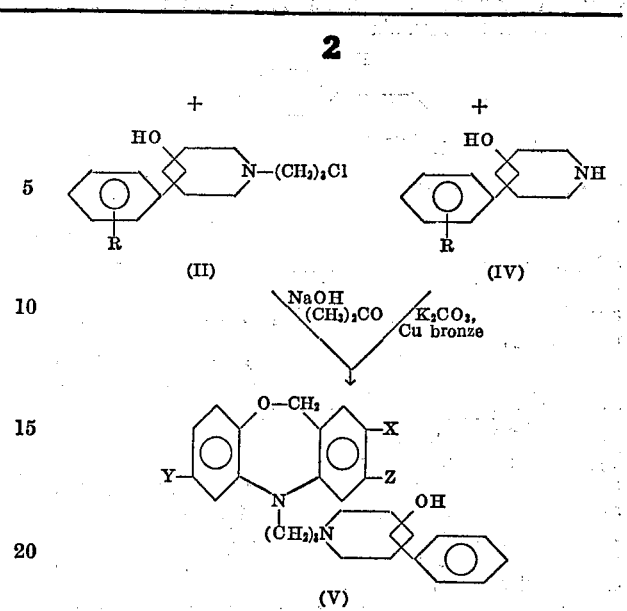

As shown in the foregoing reaction scheme, a compound of Formula V may be prepared by reacting about equimolar quantities of a compound of Formula I and a compound of Formula II. This reaction takes place in acetone solvent by refluxing in the presence of excess finely divided powdered NaOH.

Similarly, a compound of Formula V may be prepared by reacting about equimolar quantities of a compound of Formula III and a compound of Formula IV. This reaction takes place by refluxing in an aromatic or oxygenated solvent having a boiling point of from about 80° to about 110° C. Suitable aromatic solvents are, for example, benzene, toluene or xylene. Suitable oxygenated solvents are, for example, methylethylketone, methylpropylketone, methylisobutylketone, propanol, isopropanol, butanol or amyl alcohol.

The 2-hydroxy-2-R-substituted phenyl piperidine, or 3-hydroxy-3-R-substituted phenyl piperidine, or the 4-hydroxy-4-R-substituted phenyl piperidine compounds of Formula IV may be prepared by acylating a 2-, 3- or 4-piperidone to obtain the 1-acyl derivatives of Formula VI

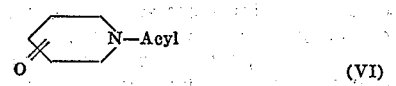

This acylation may take place by dissolving the piperidone in an aprotic solvent such as, e.g., benzene, toluene, dioxane, chloroform, tetrahydrofuran (THF), etc., and adding one equivalent of the acyl halide. Treating compound VI with an R-substituted-phenylmagnesium bromide of the formula

yields the corresponding 1-acyl-2-hydroxy-2-(R-substituted phenyl)piperidine, or 1-acyl-3-hydroxy-3-(R-substituted phenyl)piperidine, or 1-acyl-4-hydroxy-4-(R-substituted phenyl piperidine of the formula

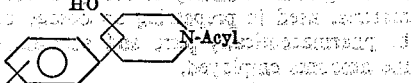

This reaction is carried out in solvents such as diethyl ether or THF under known conditions. Acid hydrolysis of the compound of Formula VIII yields the desired piperidine of the formula

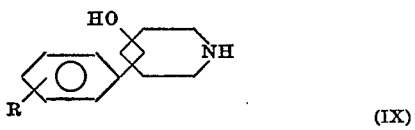

(IX)

This reaction is carried out by refluxing the compound of Formula VIII with aqueous mineral acid.

The compounds of the present invention are unusually effective antibacterial agents, for example, they have a MIC against *S. Aureus, T. Mentagrophytes, T. vaginalis* and *M. tuberculosis*, of 6.3, 12.5, 12.5 and 0.6 γ/ml., respectively.

In the treatment of tuberculosis, a compound of the present invention may be administered to mammalian species in the form of a tablet containing from about 25 to about 200 mg. of a compound of the invention. Typically, the tablet will contain about 100 mg. and will be administered four times daily. For topical application as an antibacterial agent, a compound of the present invention may be administered in the form of a cream, ointment or liquid containing about 1% by weight of a compound of the invention.

The compounds of the present invention in the described dosages may be administered orally; however, other routes such as intraperitoneally, subcutaneously, intramuscularly or intravenously may be employed.

The active compounds of the present invention are orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chtewing gum, and the like. Such compositions and preparations should contain at least 0.1% of active compound. The percentage in the compositions and preparations may, of course, be varied and may conveniently be between about 5% to about 75% or more of the weight of the unit. The amount of active compound in such therapeutically useful compositions or preparations is such that a suitable dosage will be obtained. Preferred compositions or preparations according to the present invention are prepared so that an oral dosage unit form contains between about 10 and 200 milligrams of active compound.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar or both. A syrup or elixir may contains the active compounds, sucrose as a sweetening agent, methyl and propyl parabens as preservatives, a dye and a flavoring such as cherry or orange flavor. Of course, any material used in prepatring an dosage unit form should be pharmaceutically pure and substantially nontoxic in the amounts employed.

As to the salts, those coming within the purview of this invention include the acid-addition salts, particularly the pharmaceutically acceptable acid-addition salts. Acids useful for preparing these acid-addition salts include, inter alia, inorganic acids, such as the hydrohalic acids (e.g., hydrochloric and hydrobromic acid), sulfuric acid, nitric acid, and phosphoric acid, and organic acids such as maleic, fumaric, tartaric, citric, acetic, benzoic, 2-acetoxybenzoic, salicylic, succinic acid, theophylline, 8-chlorotheophylline, p-aminobenzoic, p-acetamidobenzoic, nicotinic, or methanesulfonic acids.

The following examples illustrate the present invention without, however, limiting the same thereto. All temperatures given are in degrees centigrade unless otherwise stated.

EXAMPLE 1

1-[3 - [5,11 - dihydro - 7-(trifluoromethyl)dimenz[b,e] [1,4[-oxazepin-5-yl]propyl]-4-phenyl-4-piperidinol A suspension of 8.4 g. of micronized potassium carbonate, 0.2 g. of copper bronze, 11.2 g. of 5,11-dihydro-7-(trifluoromethyl)dibenz[b,e][1,4]oxazepin - 5 - ylpropyl chloride, 7.0 g. of 4-hydroxy-4-phenylpiperidine, and 125 ml. of toluene is stirred at reflux temperature in an atmosphere of nitrogen for about 48 hours. The hot reaction mixture is filtered, and the filtrate concentrated on a rotary evaporator. The residual oil, 19.7 g. is dissolved in 200 ml. of ether. The ethereal solution is washed with five 25 ml. portions of water, cooled in an ice water bath, and extracted with two 55 ml. portions of 10% hydrochloric acid. The acid solution is cooled in ice, 200 ml. of ether are added, followed by 50 ml. of 50% sodium hydroxide. The ethereal phase containing the base is separated and dried. The ether is removed by distillation, leaving a residual oil of about 8.5 g. which solidifies. It is purified by recrystallization from hexane with a yield of about 4 g., M.P. about 110–112°.

EXAMPLE 2

1-[3-[5,11-dihydro - 3 - chlorodibenz[b,e][1,4]oxazepin-5-yl]propyl]-4-(p-chlorophenyl) - 4 - piperidinol hydrochloride (A 1-(3-chloropropyl) - 4 - (p-chlorophenyl)-4-piperidinol: To 250.0 g. of 1-bromo-3-chloropropane in 250 ml. of anhydrous ether, cooled to 0°, is added dropwise, and with stirring, 423.0 g. of 4-(p-chlorophenyl)-4-hydroxypiperidine. Subsequently, the mixture is stirred at room temperature for about four hours, the ether layer is decanted from the precipitated solid, the solid is leached with three 100 ml. portions of anhydrous ether, the combined ether solutions are concentrated, and the residue distilled to give 1-(3-chloropropyl)-4-(p-chlorophenyl)-4-piperidinol.

(B) 1 - [3 - [5,11 - dihydro-3-chlorodibenz[b,e][1,4] oxazepin-5-yl]propyl] - 4-p-chlorophenyl-4-piperidinol hydrochloride: To 24.6 g. of 3-chloro-5,11-dihydrodibenz [b,e][1,4]oxazepine and 28.8 g. of the product from (A) in 250 ml. of acetone is added 16.0 g. of powdered sodium hydroxide and the mixture stirred and heated under reflux for about fourteen hours. The mixture is cooled, diluted with 250 ml. of water and extracted with three 100 ml. portions of ether. The ether extracts are combined, cooled in ice, and extracted with three 100 ml. portions of ice-cold 10% aqueous phosphoric acid. The aqueous acidic extracts are combined, cooled, and treated with an excess of 50% aqueous sodium hydroxide. The alkaline mixture is extracted with three 100 ml. portions of ether. The combined ether extracts are washed, dried, and concentrated to give about 27.2 g. of 1-[3-[5,11-dihydro-3-chlorodibenz[b,e][1,4]oxazepin - 5 - yl]propyl] - 4 - (p-chlorophenyl)-4-piperidinol.

To the above base, 5.0 g., in 50 ml. of anhydrous ether is added dropwise, with ice-cooling, a solution of 2.6 ml. of 2 N ethereal hydrogen chloride in 10 ml. of anhydrous ether. During the addition, a crystalline solid separates. When the addition is complete, the mixture is stirred an additional 0.5 hour at 0°, the solid is filtered, and recrystallized from acetonitrile to give about 4.2 g. of the title compound.

EXAMPLES 3–5

Following the procedure of Example 1, but substituting respectively, for 4-hydroxy-4-phenylpiperidine an equivalent quantity of the following compounds of Column I, there is obtained, respectively, the corresponding compound of Formula V wherein X, Y and Z are the same as Example 1, R is H, and the piperidine carbon to which the phenyl ring is attached is indicated in Column II.

| I | II |
|---|---|
| Example: | |
| 3 ............ 2-hydroxy-2-phenylpiperidine ............ | 2 |
| 4 ............ 3-hydroxy-3-phenylpiperidine ............ | 3 |
| 5 ............ 4-hydroxy-4-phenylpiperidine ............ | 4 |

EXAMPLES 6–16

Following the procedure of Example 1 but employing as starting material, respectively, an equivalent amount of a compound of Formula III wherein the substituents X, Y and Z are as indicated below, there is obtained, respectively, the corresponding substituted compound of Formula V.

| | Y | X | Z |
|---|---|---|---|
| Example: | | | |
| 6 ............ | $CF_3$ | H | H |
| 7 ............ | Cl | H | H |
| 8 ............ | H | H | Cl |
| 9 ............ | H | Br | Cl |
| 10 ........... | $CF_3$ | H | Cl |
| 11 ........... | Cl | H | Cl |
| 12 ........... | $CF_3$ | Br | Cl |
| 13 ........... | Cl | Br | Cl |
| 14 ........... | H | H | Br |
| 15 ........... | F | H | H |
| 16 ........... | Br | H | H |

EXAMPLES 17–27

Following the procedure of Example 2 but substituting, respectively, for 4-(p-chlorophenyl)-4-hydroxypiperidine, a compound of Column I, there is obtained, respectively, a compound of Formula V wherein X, Y and Z are the same as Example 2, the piperidine carbon to which the phenyl ring is attached is indicated in Column II, and the phenyl substituent is indicated in Column III.

| I | II | III |
|---|---|---|
| Example: | | |
| 17 ........ 2-hydroxy-2-(p-fluorophenyl)piperidine ............ | 2 | p-Fluoro. |
| 18 ........ 2-hydroxy-2-(m-chlorophenyl)piperidine ............ | 2 | m-Chloro. |
| 19 ........ 3-hydroxy-3-(o-bromophenyl)piperidine ............ | 3 | o-Bromo. |
| 20 ........ 4-hydroxy-4-(p-iodophenyl)piperidine ............ | 4 | p-Iodo. |
| 21 ........ 2-hydroxy-2-(p-tolyl)piperidine ............ | 2 | p-Methyl. |
| 22 ........ 3-hydroxy-3-(o-tolyl)piperidine ............ | 3 | o-Methyl. |
| 24 ........ 4-hydroxy-4-(m-tolyl)piperidine ............ | 4 | m-Methyl. |
| 25 ........ 2-hydroxy-2-(o-methoxyphenyl)piperidine ............ | 2 | o-Methoxy. |
| 26 ........ 3-hydroxy-3-(m-ethylthiophenyl)piperidine ............ | 3 | m-Ethylthio. |
| 27 ........ 4-hydroxy-4-(p-trifluoromethyl)piperidine ............ | 4 | p-Trifluoromethyl. |

EXAMPLE 28

Preparation of capsule formulation

| Ingredient: | Mg. per capsule |
|---|---|
| Final product of Example 1 | 100 |
| Starch | 180 |
| Magnesium stearate | 5 |

The active ingredient, starch and magnesium stearate are blended together. The mixture is used to fill hard shell capsules of a suitable size at a fill weight of 285 mg. per capsule.

EXAMPLE 29

Preparation of tablet formulation

| Ingredient: | Mg. per capsule |
|---|---|
| Final product of Example 1 | 100 |
| Corn starch (for mix) | 100 |
| Corn starch (for paste) | 100 |
| Magnesium stearate | 6 |
| Lactose | 200 |

The active ingredient, lactose and corn starch (for mix) are blended together. The corn starch (for paste) is suspended in water at a ratio of 10 grams of corn starch per 80 ml. of water and heated with stirring to form a paste. This paste is then used to granulate the mixed powders. The wet granules are passed through a No. 8 screen and dried at 120° F. The dry granules are passed through a No. 16 screen. The mixture is lubricated with magnesium stearate and compressed into tablets in a suitable tableting machine. Each tablet contains 100 mg. of active ingredient.

EXAMPLE 30

Preparation of oral syrup formulation

| Ingredient: | | Amount |
|---|---|---|
| Final product of Example 1 | mg | 5000 |
| Sorbitol solution (70% N.F.) | ml | 40 |
| Sodium benzoate | mg | 150 |
| Sucaryl | mg | 90 |
| Saccharin | mg | 10 |
| Red Dye (F.D. & C. No. 2) | mg | 10 |
| Cherry flavor | mg | 50 |
| Distilled water, q.s. to 100 ml. | | |

The sorbitol solution is added to 40 milliliters of distilled water and the active ingredient is suspended therein. The sucaryl, saccharin, sodium benzoate, flavor and dye are added and dissolved in the above solution. The volume is adjusted to 100 milliliters with distilled water.

Other ingredients may replace those listed in the above formulation. For example, a suspending agent such as bentonite magma, tragacanth, carboxymethylcellulose, or methylcellulose may be used. Phosphates, citrates or tartrates may be added as buffers. Preservatives may include the parabens, sorbic acid and the like and other flavors and dyes may be used in place of those listed above.

What is claimed is:
1. A compound of the formula

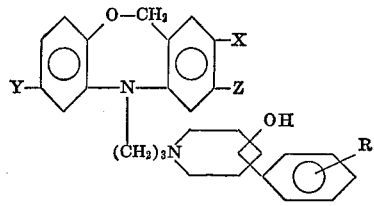

and pharmaceutically acceptable acid-addition salts thereof wherein
Y is trifluoromethyl, F, Cl, or Br;
X is H or Br;
Z is H, Cl or Br; and
R is H, alkyl of from 1 to 4 carbons, halogen, alkoxy of from 1 to 4 carbons, alkylthio of from 1 to 4 carbons, or trifluoromethyl.

2. A compound of claim 1 having the name 1-[3-[5,11-dihydro - 7-(trifluoromethyl)dibenz[b,e][1,4]oxazepin-5-yl[propyl[-4-phenyl-4-piperidinol.

References Cited

UNITED STATES PATENTS

| | | | |
|---|---|---|---|
| 3,069,432 | 12/1962 | Yale et al. | 260—333 |
| 3,071,596 | 1/1963 | Yale et al. | 260—333 |
| 3,631,052 | 12/1971 | Yale | 260—293.58 |
| 3,714,192 | 1/1973 | Yale et al. | 260—333 |
| 3,714,201 | 1/1973 | Yale et al. | 260—333 |

ALAN L. ROTMAN, Primary Examiner

G. T. TODD, Assistant Examiner

U.S. Cl. X.R.

260—293.86, 333; 424—267